(12) United States Patent
Wissenbach et al.

(10) Patent No.: US 7,592,563 B2
(45) Date of Patent: Sep. 22, 2009

(54) METHOD FOR SMOOTHING AND POLISHING SURFACES BY TREATING THEM WITH ENERGETIC RADIATION

(75) Inventors: Konrad Wissenbach, Herzogenrath (DE); Edgar Willenborg, Aachen (DE); Norbert Pirch, Aachen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 471 days.

(21) Appl. No.: 10/519,146

(22) PCT Filed: Jun. 24, 2003

(86) PCT No.: PCT/DE03/02093

§ 371 (c)(1),
(2), (4) Date: Aug. 31, 2005

(87) PCT Pub. No.: WO2004/003239

PCT Pub. Date: Jan. 8, 2004

(65) Prior Publication Data

US 2006/0081573 A1 Apr. 20, 2006

(30) Foreign Application Priority Data

Jun. 27, 2002 (DE) ................ 102 28 743

(51) Int. Cl.
*B23K 26/00* (2006.01)
(52) U.S. Cl. .............. 219/121.17; 219/121.2; 219/121.35; 219/121.61; 219/121.66; 219/121.69; 219/121.76; 219/121.85

(58) Field of Classification Search ............ 219/121.65, 219/121.66, 121.61, 121.16, 121.17, 121.2, 219/121.35, 121.69, 121.76, 121.85; 148/512
See application file for complete search history.

(56) References Cited

U.S. PATENT DOCUMENTS 4,015,100 A * 3/1977 Gnanamuthu et al. ....... 148/512

(Continued)

FOREIGN PATENT DOCUMENTS

DE 42 41 527 6/1994

(Continued)

OTHER PUBLICATIONS

K. Sridhar et al., Naval Materials Research Laboratory, "Formation of Highly Corrsion Resistant Stainless Steel Surface Alloys for Marine Environments by Laser Surface Alloying," Corrosion 1998, pp. 705/1-705-14. . . .

*Primary Examiner*—Samuel M Heinrich
(74) *Attorney, Agent, or Firm*—Venable LLP; Robert Kinberg; Justine A. Gozzi (57) ABSTRACT

The present invention relates to a method for smoothing and polishing surfaces by treating them with energetic radiation, in particular laser radiation, in which the to-be-smoothed surface is remelted in a first treatment step using said energetic radiation and employing first treatment parameters at least once down to a first remelting depth of approx. 5 to 100 μm, which is greater than a structural depth of the to-be-smoothed structures of said to-be-smoothed surface, wherein continuous radiation or pulsed radiation with a pulse duration of $\geq 100$ μs is employed. The method makes it possible to automatically polish any three-dimensional surface fast and cost effective.

15 Claims, 5 Drawing Sheets
(1 of 5 Drawing Sheet(s) Filed in Color)

U.S. PATENT DOCUMENTS

| | | | | |
|---|---|---|---|---|
| 4,100,393 A | * | 7/1978 | Luther | 219/121.71 |
| 4,122,240 A | * | 10/1978 | Banas et al. | 428/655 |
| 4,229,232 A | * | 10/1980 | Kirkpatrick | 148/512 |
| 4,299,860 A | * | 11/1981 | Schaefer et al. | 427/556 |
| 4,401,726 A | * | 8/1983 | Gnanamuthu | 428/610 |
| 4,447,275 A | * | 5/1984 | Hiraoka et al. | 148/512 |
| 4,451,299 A | * | 5/1984 | Smeggil et al. | 148/245 |
| 4,455,893 A | * | 6/1984 | Astero | 76/107.1 |
| 4,698,237 A | * | 10/1987 | Macintyre | 148/242 |
| 4,731,516 A | * | 3/1988 | Noguchi et al. | 219/121.66 |
| 4,832,798 A | * | 5/1989 | Cvijanovich et al. | 205/209 |
| 4,968,383 A | * | 11/1990 | Volkmann et al. | 216/65 |
| 5,068,514 A | * | 11/1991 | Lunney | 219/121.69 |
| 5,072,092 A | * | 12/1991 | Richter et al. | 219/121.72 |
| 5,232,674 A | * | 8/1993 | Mukai et al. | 438/662 |
| 5,601,737 A | * | 2/1997 | Asahi et al. | 219/121.66 |
| 5,900,170 A | * | 5/1999 | Marcin et al. | 219/121.66 |
| 5,997,377 A | * | 12/1999 | Sagara et al. | 445/24 |
| 6,043,452 A | * | 3/2000 | Bestenlehrer | 219/121.62 |
| 6,103,402 A | * | 8/2000 | Marcin et al. | 428/637 |
| 6,143,587 A | * | 11/2000 | Omizo | 438/106 |
| 6,400,037 B1 | * | 6/2002 | Omizo | 257/797 |
| 6,492,615 B1 | * | 12/2002 | Flanagan | 219/121.66 |
| 6,552,302 B2 | * | 4/2003 | Matsushita | 219/121.85 |
| 6,612,204 B1 | * | 9/2003 | Droese et al. | 76/104.1 |
| 6,670,575 B1 | * | 12/2003 | Wrba et al. | 219/121.68 |

FOREIGN PATENT DOCUMENTS

| | | | |
|---|---|---|---|
| DE | 43 20 408 | | 12/1994 |
| DE | 197 06 833 | | 9/1998 |
| EP | 0 601 451 | | 6/1994 |
| EP | 0 819 036 | | 1/1998 |
| JP | 020000285737 A | * | 10/2000 |
| WO | WO 96 31315 | | 10/1996 |
| WO | WO 0 230 328 | | 4/2002 |

* cited by examiner

METHOD FOR SMOOTHING AND POLISHING SURFACES BY TREATING THEM WITH ENERGETIC RADIATION

TECHNICAL FIELD

The present invention relates to a method for smoothing and polishing surfaces by treating them with energetic radiation, in particular laser radiation, in which the to-be-smoothed surface is remelted at least once in a first treatment step, using the energetic radiation and first treatment parameters down to a first remelting depth which is greater than a structural depth of the to-be-smoothed structures of the to-be-smoothed surface and is $\leq 100$ µm. The method can be used, for example, in mechanical engineering for finishing tools and molds. In modern mechanical engineering and, especially, in tool and mold construction, there are high demands on the quality of technical surfaces. However, in manufacturing processes, such as for example milling or eroding, the achievable surface roughness is limited. If smooth, glossy, respectively polished surfaces, are required, additional manufacturing processes, such as abrading and polishing, must follow.

PRIOR ART

Nowadays, tool and mold finishing occurs predominantly by means of manual polishing. Electrically or pneumatically driven devices with up to ultrasonic operating frequencies support the manual work. Until the final polishing step, the steps rough abrasion, fine abrasion and polishing with increasingly finer polishing pastes up to diamond paste must be carried out. Usual polishing times are about 30 min/cm2. Peak-to-valley heights of Ra<0.01 µm are achievable.

Mechanical polishing methods have the drawback that prior art methods cannot be applied or only yield unsatisfactory results if the to-be-polished surfaces have complex three-dimensional geometries.

DE 42 41 527 discloses a method of hardening machine components by heating the surfaces of the component using a laser beam, with which the surface of the machine component can simultaneously be smoothed. In this case, the components are chilled cast parts with a ledeburitic structure or steel parts with a pearlitic structure. In this method, a surface layer of the component is heated using a laser beam until close to the melting point in such a manner that in a boundary layer, diffusion of the carbon occurs out of the cementite lamella of the ledeburite, respectively out of the pearlite, into the soft intermediate ferrite lamella regions. The diffusion of the carbon results in the desired hardening of the surface. Setting the laser parameters with energy densities in the range of $10^3$-$10^5$ W/cm$^2$ results, moreover, in marked evaporation and melting of a thin surface skin, which simultaneously leads to micro-smoothing of the surface. This application requires the laser power of approximately 4-12 kw.

Furthermore, EP 0 819 036 B1 describes a method using a laser to polish with any three-dimensional mold surface in which the contour of the to-be-treated workpiece is first measured and then the treatment strategy and the treatment parameters are derived from the prescribed desired shape and the current shape. Smoothing and polishing are realized by a removal process. For laser polishing, a region of low laser intensity is proposed as greater material removal is not desired in this application. However, there is no other mention in this printed publication of treatment strategies or treatment parameters for achieving an optimum degree of smoothing. The heart of the proposed method is recognizing any deviation of the current shape from the desired shape by scanning using a three-dimensional contour measuring device. From this deviation, the suited treatment parameters are calculated and utilized. These steps are repeated until the desired shape is obtained. However, the required use of a three-dimensional contour measuring device is complicated and, due to the precision demanded, connected with very high costs.

DE 197 06 833 A1 discloses a method for smoothing and polishing surfaces according to the generic part of claim 1. In this method, the surface is brought to start to briefly melt with pulsed laser radiation having a pulse duration of between 10 ns and 10 µs to a depth of 2 to 3 µm with each laser pulse. The new molten mass generated with each laser pulse solidifies again before the next laser pulse occurs. However, the method is only suited for smoothing surfaces with a minimal surface roughness of Rz$\leq$3 µm.

The object of the present invention is to provide a method for smoothing and polishing surfaces by treating them with energetic radiation, in particular laser radiation, and this method does not require expensive measuring instruments and can be used to automatically polish any three-dimensional surface, in particular metal surfaces, quickly and inexpensively.

DESCRIPTION OF THE INVENTION

The object on which the present invention is based is solved using the method according to claim 1. Advantageous embodiments of the methods are the subject matter of the subordinate claims or can be drawn from the following description and the preferred embodiments.

In the present method for smoothing, respectively polishing, surfaces by treating them with energetic radiation, for example laser radiation or electron radiation, the to-be-smoothed surface is remelted in a first treatment step using the energetic radiation and employing the first treatment parameters at least once down to a first remelting depth of approximately 5 to 100 µm, which is greater than a structural depth of the to-be-smoothed structure of the to-be-smoothed surface, using continuous radiation or pulsed radiation with a pulse duration of $\geq 100$ µs.

Preferably a second treatment step is conducted then utilizing energetic radiation with second treatment parameters. In this second treatment step, the micro-roughness remaining after the first treatment step is leveled by remelting down to a second remelting depth, which is less deep than the first remelting depth, and by evaporating roughness peaks. This preferred embodiment of the present method is thus based on a multi-step treatment process, which can be divided into rough treatment and fine treatment. In the first treatment step, also referred to in the following as rough treatment, the to-be-smoothed surface is remelted once or multiple times down to a first remelting depth in a boundary layer using the energetic radiation and employing the first treatment parameters. In this remelting process, the macro-roughness which, for example may stem from previous milling, respectively eroding process, is removed. In a second treatment step, also referred to in the following as fine treatment, the remaining micro-roughness on the surface is then leveled using energetic radiation and employing the second treatment parameters. The second treatment step of the fine treatment comprises therefore a combination material removal and remelting process in which the thickness of the remelted boundary layer is less than the thickness of the remelted boundary layer of the first treatment step.

With the proposed method, any three-dimensional workpiece surface can be quickly and inexpensively automatically polished. Measuring the contour of the to-be-polished surface is not required. Moreover, due to the multi-step treatment process with different first and second treatment parameters, a high glossiness of the polished surface is achieved.

The method is particularly suited for smoothing three-dimensional metal surfaces. For example, it has already been used to smooth and polish workpieces made of the steels 1.2343, 1.2767 and 1.2311 as well as of titanium materials. Of course, the present method can also be utilized with other metals and non-metals such as, for example, workpieces made of plastic. Someone skilled in the art needs only to adapt the treatment parameters to the to-be-treated materials in order to obtain the conditions for the first treatment step and, if need be, for the second treatment step. The first treatment parameters are preferably selected in such a manner that no ablation of material or only a smallest possible ablation of material occurs, since smoothing is effected in this first treatment solely by remelting of the boundary layer down to the first remelting depth. In smoothing and polishing plastics, conducting just the first step suffices to obtain excellent smoothing results.

By utilizing continuous or pulsed energetic radiation, in particular laser radiation, with a great pulse duration of $\geq 100$ μs single or multiple remelting of the boundary layer down to the first remelting is achieved. In contrast to this, in the second treatment step, pulsed radiation with a pulse duration of $\leq 5$ μs is preferably employed to generate the high intensities required for the combination remelting and material removal process. In this second treatment step, the surface is preferably only remelted down to a second remelting depth of maximally 5 μm, whereas the greater first remelting depth of the first treatment step preferably lies between 10 and 80 μm. This first remelting depth of the first treatment step is dependent on the size of the macro-roughness of the to-be-smoothed workpiece. The greater the to-be-smoothed macro-roughness, the greater the depth of the first remelting depth has be selected in order to achieve sufficient leveling of the macro-roughness.

Furthermore, smoothing and polishing of the surface with energetic radiation should be conducted under a protective gas shroud. This may occur by treatment within a process chamber filled with protective gas or by feeding the protective gas to the surface areas being treated by means of a jet. Argon, helium or nitrogen can, for example, be used as the protective gas.

Optimum smoothing results are yielded with the present method, if the surface of the workpiece is remelted multiple times in succession in the first treatment step, preferably with a first remelting depth that decreases from remelting process to remelting process. The treatment with energetic radiation is, as in the second treatment step, conducted in a prior art manner by scanning the surface with the energetic beam. This scanning occurs in parallel paths, with the individual paths defined by the width of the single energetic beams partially overlapping. In the multiple remelting of the surface, the treatment direction is preferably turned by an angle of, for example, 90° between the single remelting processes in such a manner that the paths of successive remelting processes lie perpendicular to each other.

BRIEF DESCRIPTION OF THE DRAWINGS

The present method is made more apparent in the following using a preferred embodiment with reference to the accompanying drawings without the intention of limiting the scope or spirit of the inventive idea. The file of this patent contains at least one drawing/photograph executed in color. Copies of this patent with color drawing(s)/photograph(s) will be provided by the Office upon request and payment of the necessary fee.

WAYS TO CARRYING OUT THE INVENTION

Figure 1A:
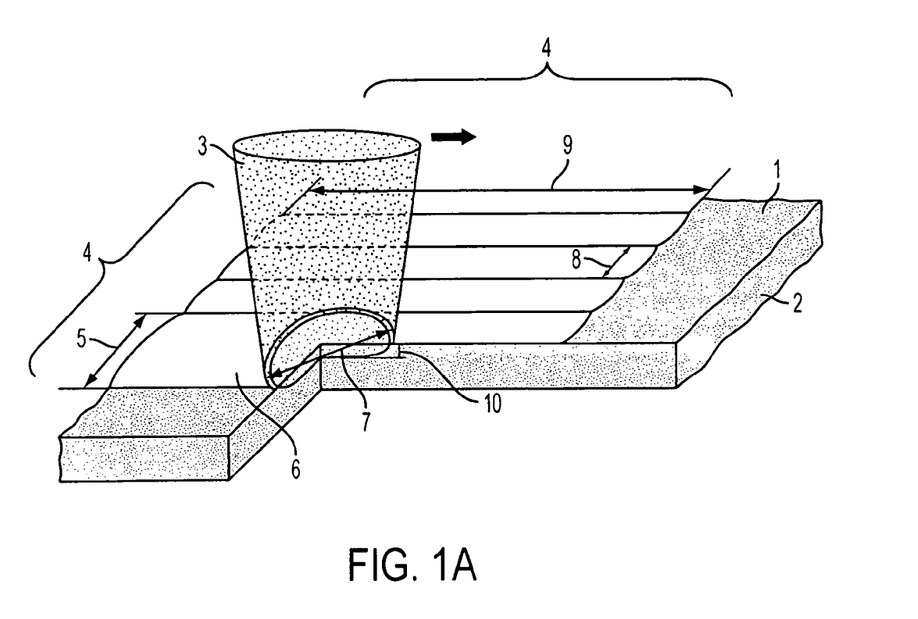
FIG. 1a shows a schematic sketch of the scanning of the to-be-smoothed surface using a laser beam and FIG. 1b shows an example of a cross-section of the laser beam.
Figure 1B:
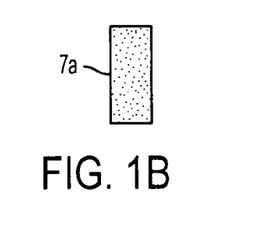

FIG. 1a shows very schematically the treatment process in the present method by scanning the surface 1 of the to-be-treated workpiece 2 with a laser beam 3. The laser beam 3 is led in parallel paths 6, preferably meandering, over a section 4 of the to-be-treated surface 1. The width 5 (track width) of the individual paths 6 is given by the diameter 7 of the laser beam on the surface 1. In order to obtain a suited intensity or track width, this beam diameter 7 may, of course, be adapted with the aid of a interconnected optic. The laser beam 3 is led over the surface 1 in the direction indicated by the arrow with a given scanning velocity. Adjacent paths 6 overlap by selecting a track offset 8 which is smaller than the track width 7. The length 9 of the individual paths 6 can be predefined. It is, however, limited by the laser scanning system employed. Therefore, in order to treat large surface areas, a multiplicity of shown sections 4 have to be treated successively. FIG. 1 also, indicates, by way of example a first remelting depth 10 down to which the workpiece 2 is remelted in the first treatment step of the present method. In addition to a round beam cross section, another beam cross section 7a, for example rectangular respectively linear can, of course, also be employed as is indicated by way of example in FIG. 1b.

In this first treatment step, a continuous or pulsed laser system with pulse lengths of >0.1 ms is utilized. The boundary layer of the workpiece 2 is melted just so deep that the roughness present on surface 1 is smoothed. This first remelting depth 10 is adapted to the original roughness. Typical first remelting depths 10 lie in the range between 10 and 100 μm. The greater the unevenness of the original surface 1, the deeper the remelting has to be in order to permit the necessary volume compensation. For example, greater first remelting depths are required for milled surfaces than for abraded surfaces. Using a continuous laser beam, respectively a pulsed laser beam with long pulse lengths, prevents evaporation of material from the surface 1 in this rough treatment of the first treatment step, permitting thereby carrying out the polishing process with substantially less energy than is the case with applications in which the macro-roughness is removed. Furthermore, local overheating in the molten bath which leads to material removal and to undesired molten bath movements and thus to deteriorating the surface roughness is largely prevented.

For this first treatment step of the present method, the beam source is preferably a Nd:YAG laser, a $CO_2$ laser, a diode laser or an electron beam source. The laser power lies in the range from 40-4000 W. The beam diameter being 100-1000 μm, the scanning velocity is approximately 30-300 mm/s and the track offset is selected between 10 to 400 μm. The interaction times with the surface lie preferably between 200 μs and 10 ms. Passing surface 1, respectively the section 4 just undergoing treatment, multiple times and turning the treatment direction by, for example, 90° permits improving the first treatment step further.

Figure 2:
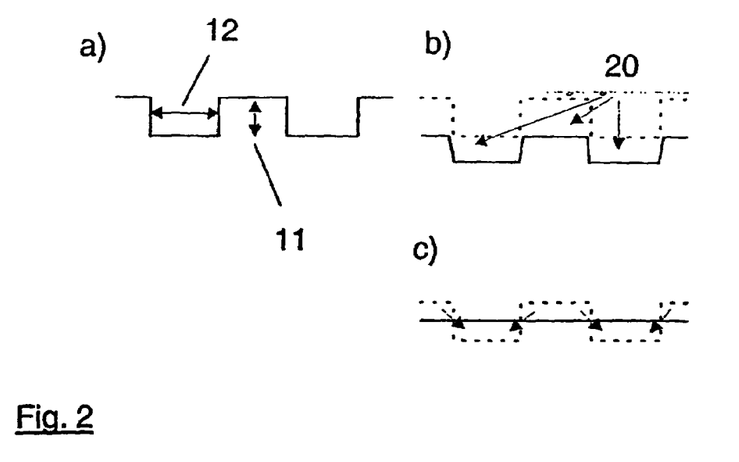
FIG. 2 shows a rather schematic representation of an example of an original profile of a surface including the results of various polishing concepts.

FIG. 2 shows, as an example, in a very schematic representation a section of an abstracted original profile (FIG. 2a) of a to-be-treated surface with macro-roughness with a height 11 of 10 μm and a width of, respectively a distance 12 of 300 μm (not shown to scale). These measures correspond to typical original dimensions of the original roughness of a surface with a milling structure.

FIG. 2c shows the effect of the first treatment step of the present method in which the surface (previously: broken line; after: continuous line) is remelted to a remelting depth of approximately 10 μm. Remelting the material in this remelting step levels the macro-roughness.

In comparison, FIG. 2b shows a result as obtained by flat removal of surface material in polishing. This example clearly shows that the macro-roughness cannot be completely removed by flat removal (20: areas of removed material).

Figure 3:
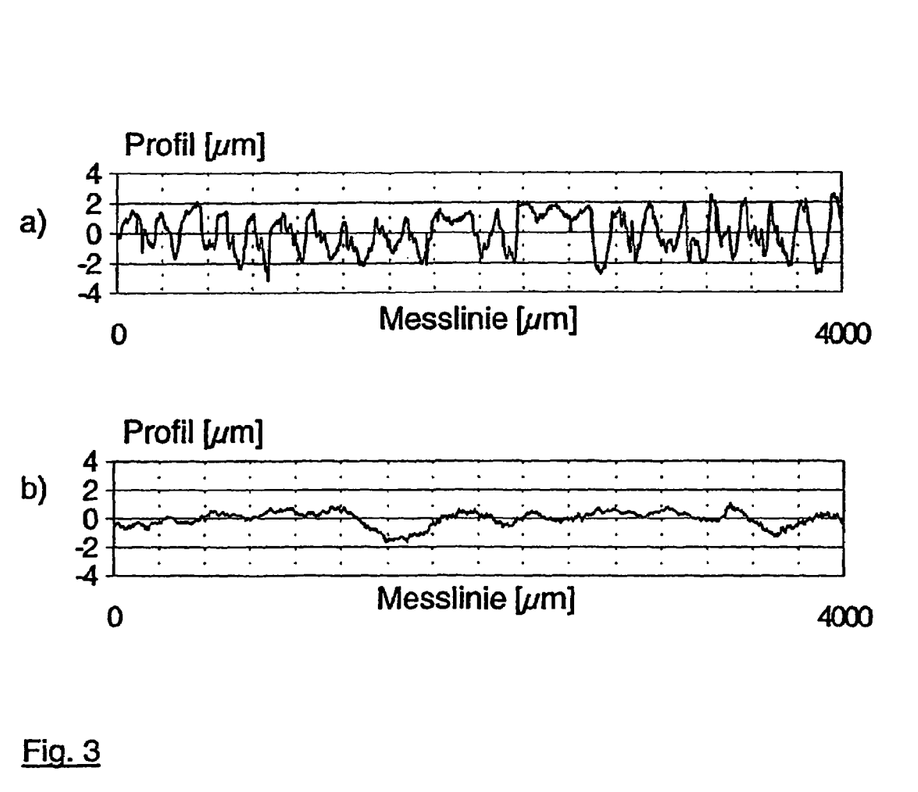
FIG. 3 shows a comparison of surface profiles of an unprocessed milled surface with a surface profile of the surface of following the first treatment step of the present method.

FIG. 3 finally shows measured surface profiles of a to-be-treated, respectively treated, surface. FIG. 3a shows a measured profile of an untreated, milled surface where the macro-roughness is clearly visible. Following carrying out the first treatment step of the present method, a profile of this surface is obtained, as depicted in FIG. 3b. This figure clearly shows definite smoothing of the macro-roughness after the first treatment step.

Figure 4:
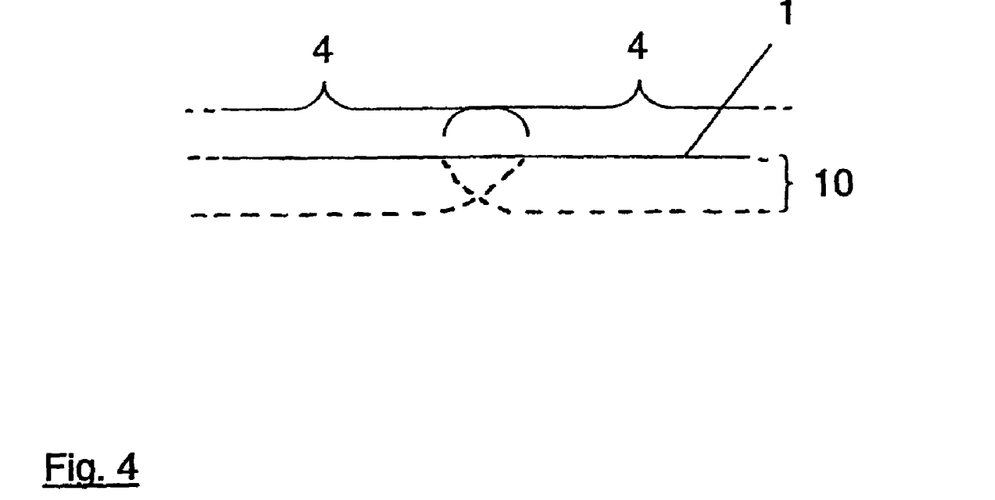
FIG. 4 shows an example of the treatment strategy for successive processing a multiplicity of adjacent treatment sections.

In the case of large to-be-smoothed surfaces, a multiplicity of sections 4 of surface 1 depicted in FIG. 1 have to be treated successively with laser radiation. In order that the boundaries, respectively the beginning of the respective adjacent section (4) are not visible on the finished workpiece, the treatment parameters are continuously changed, respectively changed in steps, down to the border of these sections 4 in such a manner that the first remelting depth is reduced. FIG. 4 shows in a section an example of such a type of treatment strategy. In this section, two treated sections 4 are adjacent to each other. In the transition region between the two sections 4, the remelting depth 10 is continuously reduced in such a manner that there are no abrupt changes in smoothing in this transition region. Changing the treatment parameters down to the border of section 4 can be achieved by defocusing the laser beam, by reducing the power, for example using power ramps, by increasing the feed rate, for example using feed rate ramps, or by varying the position of the beginning, end, or turning points.

Figure 5:
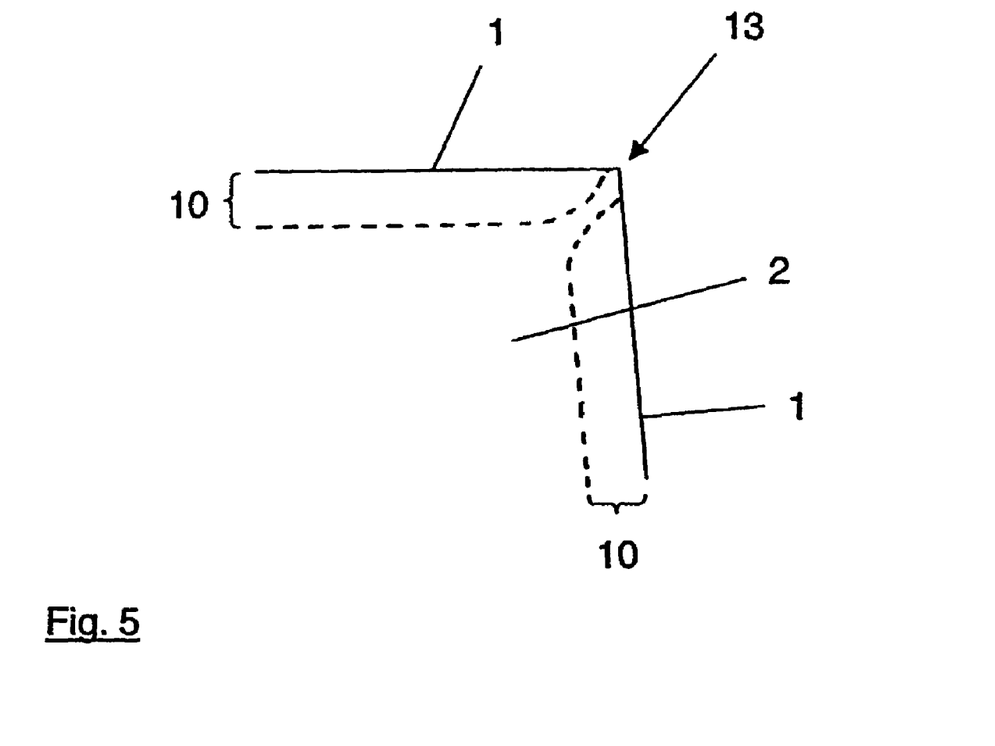
FIG. 5 shows an example of the treatment strategy for retaining edges on the to-be-smoothed surface.

In polishing injection mold tools, it is essential that the edge at the separation plane of the tool is not rounded, because this would lead to undesired formation of crests on the plastic parts produced with the tool. In order to prevent rounding at the to-be-retained edges of the surface of the tool, a similar strategy can be used in carrying out the present method as in successively processing adjacent treatment sections. The treatment parameters are changed toward the edge in such a manner that the first remelting depth decreases. The edge itself must not be remelted as this would always lead to rounding it. FIG. 5 shows that of the two sections of surface 1 adjacent at edge 13, the first remelting depth 10 decreases toward edge 13 so that no remelting occurs at the edge 13 itself. This reduction of the remelting depth can be achieved by decreasing the laser power, respectively increasing the feed rate toward the edge 13.

Figure 6:
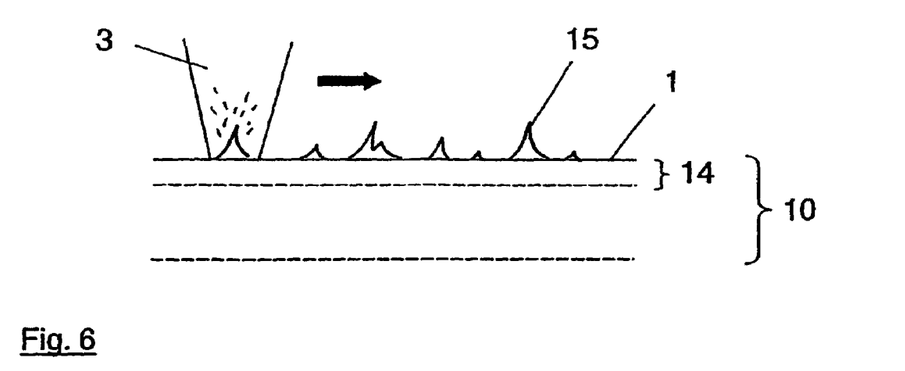
FIG. 6 shows a schematic representation of an example of the different remelting depths of the first and second treatment steps of the present method.

After smoothing the surface in the first treatment step, the degree of gloss is raised in a second treatment step using a pulsed laser with pulse lengths of <1 μs. By selecting a second remelting depth 14, which is less than the first remelting depth 10, a very thin boundary layer of <5 μm is remelted and the remaining micro-roughness peaks 15 are removed by evaporating the material. This is depicted very schematically in FIG. 6 showing the first remelting depth 10 and the second remelting depth 14 as well as the remaining micro-roughness peaks 15 remaining after the first treatment step. A glossy surface is obtained with this second treatment step.

Figure 7:
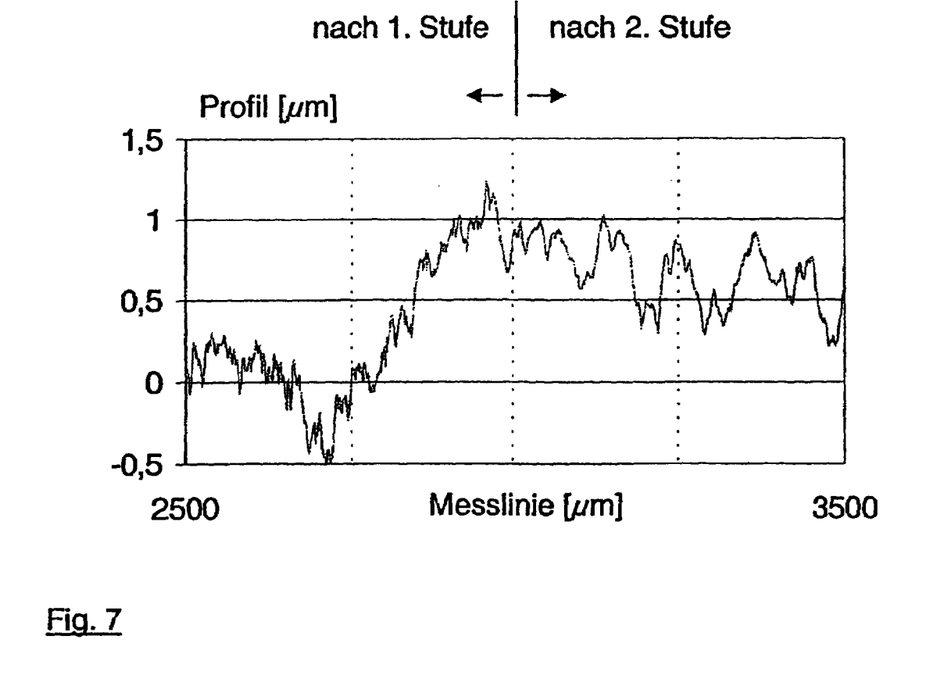
FIG. 7 shows a representation comparing the measured surface profile following the first and following the second treatment step.

FIG. 7 shows a measured profile of a surface smoothed using the present method. Depicted in the left part of the figure is the surface roughness remaining after the first treatment step, and depicted in the right part of the figure is the surface profile after the second treatment step. In this representation, the reduction in the thickness of the line indicates the substantial reduction of the micro-roughness to a magnitude of ≦0.1 μm remaining after the first treatment step.

Treatment in the second treatment step also occurs by scanning the surface, for example on a meandering path. Typical treatment parameters for the second treatment step are the use of a Nd:YAG laser or an excimer laser with a laser power of 5-200 W and a scanning velocity of 300-3000 mm/s with a beam diameter of 50-500 μm and a track offset of 10-200 μm.

Figure 8:
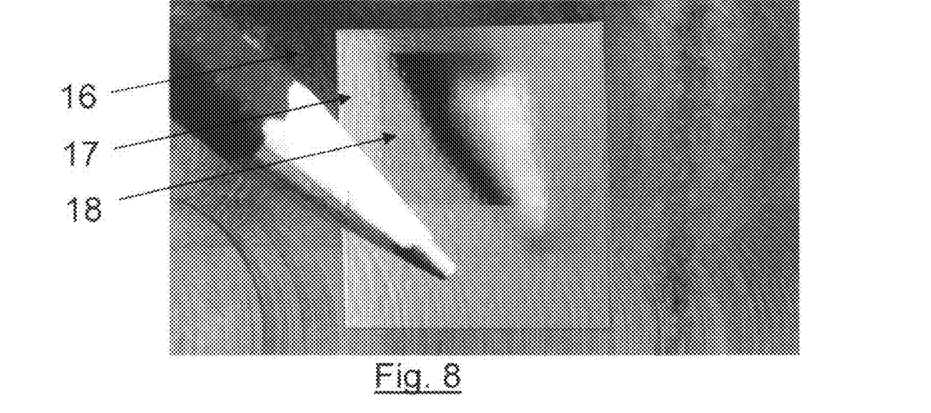
FIG. 8 shows a photographic representation of a surface before smoothing using the present method following the first treatment step and following the second treatment step; and FIG. 9a and FIG. 9b shows an example of smoothing a surface using the present method while retaining structures of significance.

Finally, FIG. 8 is a photograph of a surface showing a region 16 following milling, a region 17 following the first treatment step and a region 18 following the second treatment step. The glossy surface yielded by the second treatment step is quite evident in this figure compared to the smoothing of the first step, respectively compared to the unsmoothed surface.

Figure 9A:
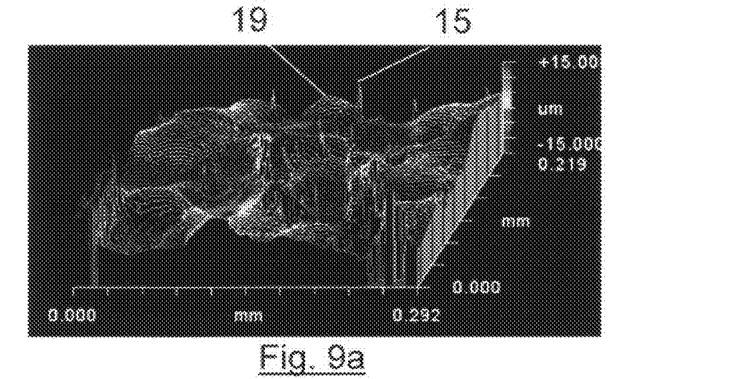
Figure 9B:
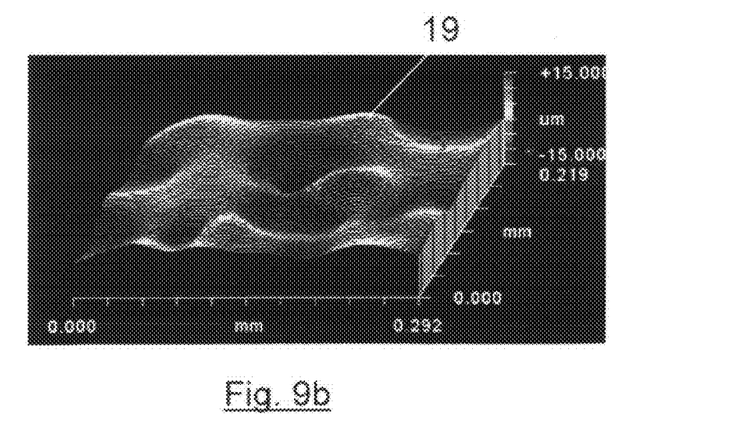

With suited selection of the treatment parameters, surfaces can also be polished in such a manner that the structures of significance present in a surface are retained, undesired micro-roughness, however, is removed. By selecting the treatment parameters, in particular the first remelting depth, it can be set which structure of the surface are smoothed and which are to remain. Thus, for example, an eroded surface can be polished to a high gloss while retaining the erosion structure and in this way producing grained surfaces for injection mold tools, as is shown, for example, in FIG. 9a and FIG. 9b. FIG. 9a shows an eroded, unpolished surface with corresponding structures of significance 19 and micro-roughness 15. FIG. 9b shows the same eroded surface after smoothing according to the present method. It is clearly visible that the micro-structures have been completely removed and but that the structures of significance 19 are still present. Changing the treatment parameters during treatment results in varyingly strongly smoothed structures, and in this way different gray hues can be realized, for example for creating inscriptions on a surface.

LIST OF REFERENCES 1 surface
2 workpiece
3 laser beam
4 section of the surface, resp. treatment field
5 track width
6 path
7 beam diameter
7a beam cross section
8 track off set
9 path length
10 first remelting depth
11 height of the macro-roughness
12 width of, resp. distance, the macro-roughness
13 edge
14 second remelting depth
15 micro-roughness
16 untreated area
17 treated area after the first treatment step
18 treated area after the second treatment step
19 structures of significance
20 removed material

What is claimed is:

1. A method for smoothing and polishing a to-be-smoothed surface, comprising:
    a first treatment step comprising remelting the to-be-smoothed surface using energetic radiation while employing first treatment parameters at least once down to a first remelting depth which is greater than a structural depth of to-be-smoothed structures of said to-be-smoothed surface, wherein the using of energetic radiation includes using continuous energetic radiation or pulsed energetic radiation with a pulse duration of $\geq 100$ µs, such that said surface is remelted down to a first remelting depth of about 5 to 100 µm, and
    a second treatment step comprising leveling micro-roughness remaining on said surface after said first treatment step by remelting the micro-roughness using said energetic radiation while employing second treatment parameters down to a second remelting depth, and by evaporating roughness peaks, wherein the second remelting depth is less than said first remelting depth.

2. A method according to claim 1, including selecting said first treatment parameters so that no ablation of material occurs.

3. A method according to claim 1, wherein the using step includes using pulsed laser radiation with a pulse duration of $\leq 1$ µs is employed in said second treatment step.

4. A method according to claim 1, wherein the remelting step includes remelting said surface in said first treatment step down to a first remelting depth of approximately 10 to 80 µm.

5. A method according to claim 1, wherein the remelting of said surface in said second treatment step includes remelting said surface down to a second remelting depth of maximally 5 µm.

6. A method according to claim 1, wherein the remelting step includes remelting said surface in said first treatment step multiple times in succession.

7. A method according to claim 6, wherein with each new remelting step, selecting said first remelting depth less deep than in the previous remelting step.

8. A method according to claim 6, wherein the remelting step includes leading said energetic radiation in parallel paths over said surface with successive remelting steps of a section of said surface being carried out with paths turned at an angle.

9. A method according to claim 1, wherein treatment in said first treatment step occurs successively in a multiplicity of adjacent sections of said surface, with the treatment parameters being changed continuously or in steps towards a border of said sections in such a manner that said first remelting depth decreases to said border of said sections.

10. A method according to claim 1, wherein in order to retain edges on said surface, said first treatment parameters of said first treatment step are changed continuously or in steps in such a manner that said first remelting depth decreases toward said edges.

11. A method according to claim 1, wherein the remelting step includes leading said energetic radiation on one or a multiplicity of meandering paths over said surface.

12. A method according to claim 1, including impinging said surface with protective gas during said first and said second treatment steps.

13. A method according to claim 1, wherein treatment occurs with a beam cross section in form of a line or with a rectangular beam cross section of said energetic radiation.

14. A method according to claim 1, further comprising preheating said to-be-smoothed surface before remelting.

15. A method according to claim 1, including selecting said first treatment parameters so that structures of significance of said to-be-smoothed surface are retained during remelting.

\* \* \* \* \*

UNITED STATES PATENT AND TRADEMARK OFFICE
CERTIFICATE OF CORRECTION

PATENT NO. : 7,592,563 B2  Page 1 of 1
APPLICATION NO. : 10/519146
DATED : September 22, 2009
INVENTOR(S) : Wissenbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Twenty-first Day of September, 2010

David J. Kappos
*Director of the United States Patent and Trademark Office*